J. Bryant,

Shears,

No. 1,999. Reissued June 20, 1865.

Witnesses:
Phineas B. Sills
William Cullen Bryant

Inventor:
J. Bryant.

UNITED STATES PATENT OFFICE.

JOEL BRYANT, OF BROOKLYN, NEW YORK.

IMPROVEMENT IN SHEARS.

Specification forming part of Letters Patent No. 40,010, dated September 22, 1863; antedated July 29, 1863; Reissue No. 1,999, dated June 20, 1865.

*To all whom it may concern:*

Be it known that I, JOEL BRYANT, of the city of Brooklyn, in the county of Kings and State of New York, have invented a new and Improved Mode of Constructing Shears and Scissors; and I declare the following to be a full, clear, and correct description of the same, to wit:

The nature of my invention consists in so curving the blades of shears and scissors, and so setting the rivets therein, (in consequence of the curve in the blades,) as to cause the edges of the blades of said shears and scissors to meet and close below the rivet or line of the rivet, as hereinafter described, and thus give an increase of leverage-power to the blades and a drawing-in cut.

Figure 1:
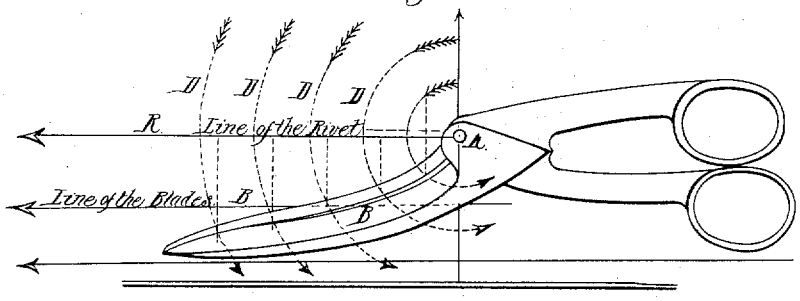
Figure 2:
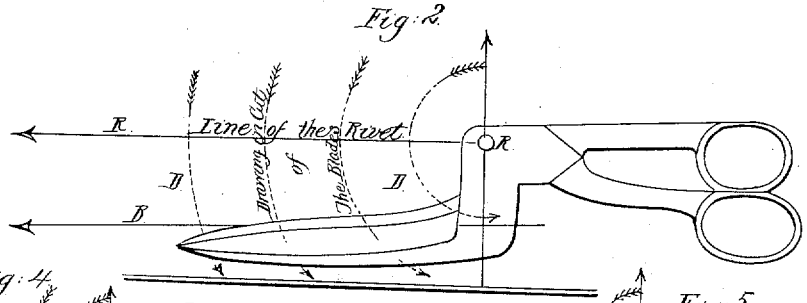
Figure 4:
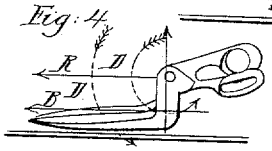
Figure 5:
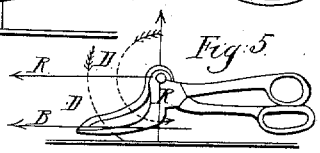
Figure 3:
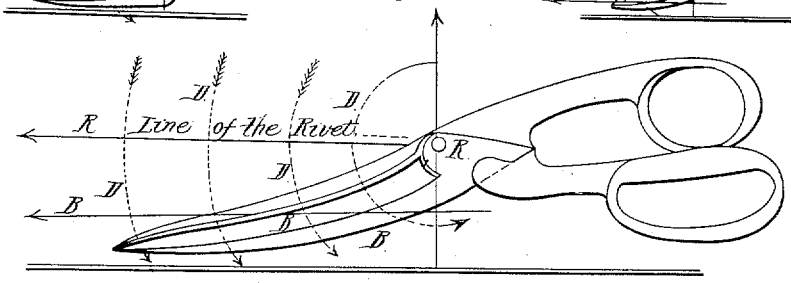

To enable others skilled in the art to make and use my improved shears and scissors, I will proceed more fully to describe their construction and operation, reference being made to the accompanying drawings, and to the figures and letters marked thereon, and forming a part of this specification, to wit:

Figures 1, 2, 3, 4, and 5 in said drawings represent several varieties of my improved shears and scissors, and very clearly show the way, mode, or manner in which they are constructed so as to cause the rivet or line of the rivet to stand above the blades or line of the blades, and thus cause the edges of said blades B to meet and close upon each other below the horizontal line R of the rivet, and thus gain an increase of leverage-power and a drawing-in cut, as shown by the curved arrows D. As it will be obvious by an examination of said figures that the upper blade, (which is the principal moving blade in my improved shears and scissors,) as it turns in a circle on its fulcrum—the rivet R—and passes in its downward course the line R of the rivet, it then commences to gain leverage-power and have a drawing-in cut, by thus falling below the said line R and closing on the under blade below the horizontal line R of its fulcrum—the rivet; and thus, substantially as shown in the drawings by Figs. 1, 2, 3, 4, and 5, and as herein described, I construct my improved shears and scissors of every variety, kind, or description, varying the curve of their blades to a greater or less extent, as circumstances may require, yet in all cases, and in every variety of my improved shears and scissors, the rivet or line R of the rivet, as shown in the drawings, will always be found to stand above the line B of the blades, substantially as shown in Figs. 1, 2, 3, 4, and 5; and by this distinctive mark or peculiarity my improved shears and scissors, of every variety, may be known and distinguished from all others. In other and ordinary shears and scissors, with or without curved blades or crooked handles, their blades meet and close on a line with their rivets.

The philosophy and the advantages of my invention, as herein set forth, will be apparent to every well-informed mind without further illustration; and it will be found that in the use of my said shears and scissors their shape will be found quite as convenient, and for most purposes decidedly preferable, to the straight blades of ordinary construction.

What I claim as my invention, and desire to secure by Letters Patent of the United States, is as follows, to wit:

The construction and exclusive use of shears and scissors (Figs. 1, 2, 3, 4, and 5) whose blades are so curved and whose rivets R are so set as to cause the edges of the said blades B to meet and close below the line R of their rivets, substantially as herein described, and for the purposes set forth in this specification.

JOEL BRYANT.

Witnesses:

PHINEAS B. SILLS,
WALTER NICHOL,
WILLIAM CULLEN BRYANT.